(12) United States Patent
Hagihara

(10) Patent No.: US 10,145,457 B2
(45) Date of Patent: Dec. 4, 2018

(54) PENDULUM DAMPER DEVICE AND LOCK-UP DEVICE FOR TORQUE CONVERTER

(71) Applicant: EXEDY Corporation, Neyagawa-shi, Osaka (JP)

(72) Inventor: Yoshiyuki Hagihara, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 166 days.

(21) Appl. No.: 14/912,048

(22) PCT Filed: Sep. 1, 2014

(86) PCT No.: PCT/JP2014/072873
§ 371 (c)(1),
(2) Date: Feb. 12, 2016

(87) PCT Pub. No.: WO2015/041029
PCT Pub. Date: Mar. 26, 2015

(65) Prior Publication Data
US 2016/0186848 A1 Jun. 30, 2016

(30) Foreign Application Priority Data
Sep. 17, 2013 (JP) ................. 2013-191350

(51) Int. Cl.
*F16H 45/02* (2006.01)
*F16F 15/14* (2006.01)
*F16D 13/40* (2006.01)

(52) U.S. Cl.
CPC ............ *F16H 45/02* (2013.01); *F16D 13/40* (2013.01); *F16F 15/145* (2013.01);
(Continued)

(58) Field of Classification Search
CPC ............ F16H 45/02; F16H 2045/0278; F16H 2045/0263; F16H 2045/0205; F16H 2045/0226; F16D 13/40; F16F 15/145
See application file for complete search history.

(56) References Cited

U.S. PATENT DOCUMENTS

2012/0031226 A1 2/2012 Jung
2012/0180473 A1* 7/2012 Huegel ............ F16F 15/12373
60/435
(Continued)

FOREIGN PATENT DOCUMENTS

CN 102792059 A 11/2012
DE 102010011824 A1 10/2010
(Continued)

OTHER PUBLICATIONS

International Search Report for Int'l App. No. PCT/JP2014/072873, dated Dec. 2, 2014, 1-2.

*Primary Examiner* — Ramya P Burgess
*Assistant Examiner* — Lillian T Nguyen
(74) *Attorney, Agent, or Firm* — United IP Counselors, LLC

(57) ABSTRACT

A pendulum damper device includes a rotary member rotatable about a rotational axis. The rotary member includes a plurality of guide groove parts circumferentially aligned. The pendulum damper device also includes a plurality of pendulum units supported by the guide groove parts. The pendulum units swing along the guide groove parts so as to attenuate vibration when the rotary member is rotated. In addition, the pendulum damper device includes a plurality of stoppers mounted to the rotary member. Each of the stoppers is contacted to a part of each of the pendulum units so as to restrict a swing range of the each of the pendulum units.

6 Claims, 4 Drawing Sheets

(52) U.S. Cl.
CPC ............... *F16H 2045/0205* (2013.01); *F16H 2045/0221* (2013.01); *F16H 2045/0263* (2013.01); *F16H 2045/0278* (2013.01)

(56) References Cited

U.S. PATENT DOCUMENTS

| | | | |
|---|---|---|---|
| 2013/0150169 A1* | 6/2013 | Krause | F16F 15/145 |
| | | | 74/574.2 |
| 2013/0239745 A1* | 9/2013 | Maienschein | F16F 15/145 |
| | | | 74/574.2 |

FOREIGN PATENT DOCUMENTS

| | | | | |
|---|---|---|---|---|
| DE | 102011013232 A1 | 9/2011 | | |
| JP | 2010196815 A | 9/2010 | | |
| JP | 2011208774 A | 10/2011 | | |
| JP | 2012523533 A | 10/2012 | | |
| JP | 2013522549 A | 6/2013 | | |
| WO | 2010118719 A1 | 10/2010 | | |
| WO | 2011110168 A1 | 9/2011 | | |
| WO | WO-2014067727 A1 * | 5/2014 | ............ | F16F 15/145 |

* cited by examiner

PENDULUM DAMPER DEVICE AND LOCK-UP DEVICE FOR TORQUE CONVERTER

CROSS-REFERENCES TO RELATED APPLICATIONS

This application is the U.S. National Phase of PCT International Application No. PCT/JP2014/072873, filed on Sep. 1, 2014. That application claims priority to Japanese Patent Application No. 2013-191350, filed Sep. 17, 2013. The contents of both applications are herein incorporated by reference in their entirety.

BACKGROUND

Technical Field

The present invention relates to a pendulum damper device and a lock-up device for a torque converter including the same.

Background Art

Torque converters are often equipped with a lock-up device for directly transmitting a torque from a front cover to a turbine. The lock-up device includes a piston configured to be frictionally coupled to a front cover, a drive plate fixed to the piston, a driven plate and a plurality of torsion springs. The driven plate is fixed to the turbine of the torque converter and is elastically and rotation-directionally coupled to the drive plate through the torsion springs.

Among the lock-up devices constructed as described above, Japan Laid-open Patent Application Publication No. 2011-208774 describes a type of lock-up device that a pendulum damper is mounted on the engine side of the front cover so as to attenuate vibration. On the other hand, Japanese translation of PCT International Application Publication No. 2012-523533 describes a pendulum damper device in which pairs of pendulum masses are mounted to the both faces of a pendulum flange configured to be rotated. Here, each pair of opposed pendulum masses is joined by pins axially penetrating the pendulum flange. Additionally, each pin is supported by a bearing while being movable within a cutout of the pendulum flange.

SUMMARY

The lock-up device described in Japan Laid-open Patent Application Publication No. 2011-208774 is capable of attenuating vibration by the pendulum damper. However, the device described in Japan Laid-open Patent Application Publication No. 2011-208774 has a construction that a damper mechanism is mounted between the front cover and the engine. Hence, it is inevitable that the device is axially elongated.

On the other hand, in the device described in Japanese translation of PCT International Application Publication No. 2012-523533, the pendulum damper device can be implemented with a relatively simple construction. However, in the device described in Japanese translation of PCT International Application Publication No. 2012-523533, when the pendulum masses swing in a wide range, the bearings could collide against the end surfaces of the cutouts of the pendulum flange. This is likely to result in abnormal abrasion and damage of the pendulum flange and the bearings.

It is an object of the present invention to inhibit abnormal abrasion and damage of a member to which a pendulum is mounted and its related members in a pendulum damper device.

It is another object of the present invention to add a mechanism for attenuating vibration to a well-known lock-up device at low cost without occupying an excessive space, and in addition, to inhibit the abnormal abrasion and damage.

Solution to Problems

A pendulum damper device according to a first aspect of the present invention includes a rotary member, a plurality of pendulum units and a plurality of stoppers. The rotary member is rotatable about a rotational axis, and includes a plurality of guide groove parts circumferentially aligned. The plural pendulum units are supported by the guide groove parts, and are configured to swing along the guide groove parts so as to attenuate vibration when the rotary member is rotated. The plural stoppers are mounted to the rotary member, and each of the stoppers is configured to be contacted to a part of each of the pendulum units so as to restrict a swing range of the each of the pendulum units.

In the present device, the plural pendulum units are mounted to the rotary member and are swung along the guide groove parts of the rotary member, whereby vibration can be attenuated. Additionally, the swing range of each of the pendulum units is restricted by each of the stoppers mounted to the rotary member.

The swing range of each of the pendulum units is herein restricted by each of the stoppers. Hence, the pendulum units can be avoided from colliding against the ends of the guide groove parts of the rotary member. Therefore, it is possible to inhibit abnormal abrasion of the guide groove parts of the rotary member and damage of the rotary member.

A pendulum damper device according to a second aspect of the present invention relates to the device according to the first aspect, and wherein the each of the stoppers includes an elastic part at least in a region thereof to which the each of the pendulum units is contacted.

The elastic part is herein provided on the region of each of the stoppers to which each of the pendulum units is contacted. The elastic part may be a member provided separately from the body of each of the stoppers. Alternatively, each of the stoppers may be entirely made of an elastic member. In the construction herein described, each of the pendulum units is contacted to the elastic part of each of the stoppers. Accordingly, the swing range is restricted, and occurrence of shock and production of noise are relieved in contact of each of the pendulum units and each of the stoppers.

A pendulum damper device according to a third aspect of the present invention relates to the device according to the first or second aspect, and wherein each of the plural guide groove parts includes first and second grooves that respectively have a circular-arc shape and are arranged line-symmetrically to each other. Additionally, the each of the pendulum units includes first and second pins and a pair of swing plates. The first pin axially penetrates the first groove and is capable of swinging along the first groove, whereas the second pin axially penetrates the second groove and is capable of swinging along the second groove. The swing plates of each pair are disposed axially in opposition to each other through the rotary member, are respectively arranged to overlap with both of the first and second grooves, and are fixed to each other by the first and second pins. At least one of the swing plates is contactable to the each of the stoppers.

Here, the first pin for fixing each pair of swing plates swings along the first groove, whereas the second pin for fixing each pair of swing plates swings along the second groove. The first and second pins fix each pair of swing plates, and vibration is attenuated by swing of each pair of swing plates. Additionally, the swing range of each pair of swing plates is restricted when at least either of the swing plates of each pair is contacted to each of the stoppers.

A pendulum damper device according to a fourth aspect of the present invention relates to the device according to the third aspect, and wherein the first and second pins are supported by and capable of swinging along the first and second grooves through bearings.

A pendulum damper device according to a fifth aspect of the present invention relates to the device according to the third or fourth aspect, and wherein adjacent ends of the first and second grooves are disposed on an inner peripheral side of remote ends thereof.

A lock-up device for a torque converter according to a sixth aspect of the present invention is a device configured to transmit a torque from a front cover to a turbine of the torque converter, and includes an input rotary member, a clutch portion, an output rotary member, a plurality of elastic members, a plurality of pendulum units and a plurality of stoppers. The clutch portion is disposed between the front cover and the input rotary member. The output rotary member is coupled to the turbine, and includes a plurality of guide groove parts circumferentially aligned. The plural elastic members elastically and rotation-directionally couple the input rotary member and the output rotary member. The plural pendulum units are supported by the guide groove parts of the output rotary member, and are configured to swing along the guide groove parts so as to attenuate vibration when the output rotary member is rotated. The stoppers are mounted to the output rotary member, and is configured to be contacted to a part of each of the pendulum units so as to restrict a swing range of the each of the pendulum units.

According to the pendulum damper device as described above, it is possible to inhibit abnormal abrasion and damage of the member to which the pendulum is mounted and its related members. On the other hand, according to the lock-up device of the present invention, it is possible to add the mechanism for attenuating vibration to a well-known lock-up device at low cost without occupying an excessive space, and in addition, to inhibit the abnormal abrasion and damage.

DETAILED DESCRIPTION OF EMBODIMENTS

[Entire Construction of Torque Converter]

Figure 1:
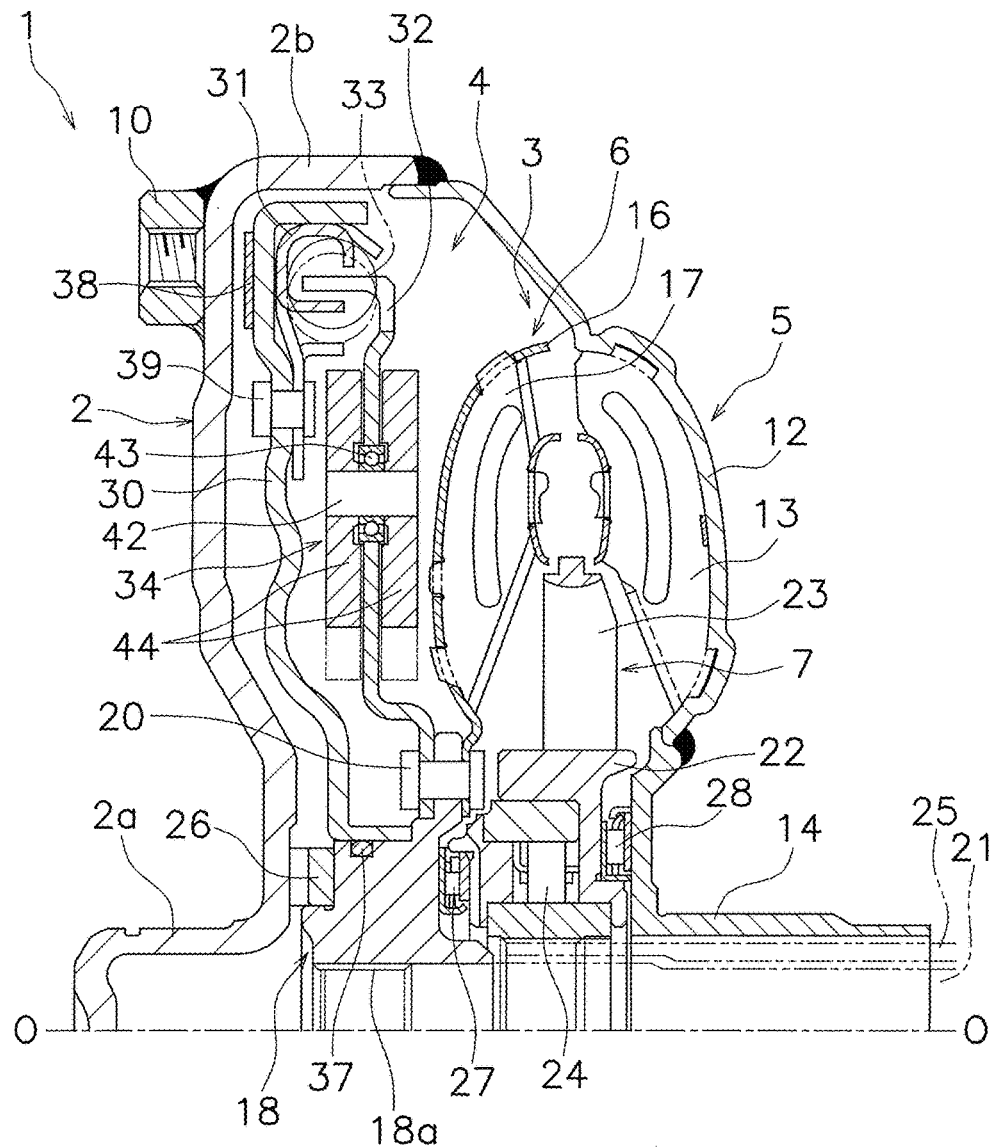
FIG. 1 is a cross-sectional view of a torque converter equipped with a lock-up device according to an exemplary embodiment of the present invention.

FIG. 1 is a partial cross-sectional view of a torque converter 1 employing a lock-up device according to an exemplary embodiment of the present invention. In FIG. 1, an engine (not shown in the drawing) is disposed on the left side whereas a transmission (not shown in the drawing) is disposed on the right side. Line 0-0 depicted in FIG. 1 indicates a rotational axis of both the torque converter and the lock-up device.

The torque converter 1 includes a front cover 2, a torque converter body 3 and a lock-up device 4. The torque converter body 3 includes a fluid actuation chamber having a torus shape. The fluid actuation chamber is composed of an impeller 5, a turbine 6 and a stator 7.

The front cover 2 is a disc-shaped member and has a boss 2a in the rotational center part thereof. The boss 2a is tubularly formed by extruding the inner peripheral part of the front cover 2 toward the engine, and is inserted into a center hole of a crankshaft (not shown in the drawings). A plurality of nuts 10 are fixed to the outer peripheral part of the front cover 2 while being circumferentially aligned at equal intervals. The outer peripheral part of a flexible plate (not shown in the drawings) is fixed to the front cover 2 by bolts (not shown in the drawings) screwed into the nuts 10.

The impeller 5 includes an impeller shell 12, a plurality of impeller blades 13 fixed to the inside of the impeller shell 12, and an impeller hub 14 fixed to the inner peripheral part of the impeller shell 12. The outer peripheral edge of the impeller shell 12 is welded to the tip of an outer peripheral tubular part 2b formed on the outer peripheral part of the front cover 2.

The turbine 6 is disposed axially in opposition to the impeller 5. The turbine 6 includes a turbine shell 16, a plurality of turbine blades 17 fixed to the inside of the turbine shell 16, and a turbine hub 18 fixed to the inner peripheral edge of the turbine shell 16. The inner peripheral end of the turbine shell 16 is fixed to the turbine hub 18 by a plurality of rivets 20. Additionally, a spline 18a is formed on the inner peripheral surface of the turbine hub 18 so as to be engaged with an input shaft 21 of the transmission. Accordingly, the turbine hub 18 is configured to be unitarily rotated with the input shaft 21.

The stator 7 is a mechanism for regulating the flow of operating oil returning from the turbine 6 to the impeller 5, and is disposed between the inner peripheral part of the impeller 5 and that of the turbine 6. The stator 7 includes an annular stator shell 22 and a plurality of stator blades 23 mounted to the outer peripheral surface of the stator shell 22. The stator shell 22 is supported by a tubular stationary shaft 25 through a one-way clutch 24. The stationary shaft 25 extends between the outer peripheral surface of the input shaft 21 and the inner peripheral surface of the impeller hub 14.

A thrust washer 26 is disposed axially between the inner peripheral part of the front cover 2 and the turbine hub 18. Additionally, a thrust bearing 27 is disposed axially between the turbine hub 18 and the one-way clutch 24, whereas a thrust washer 28 is disposed axially between the stator 7 and the impeller 5.

[Construction of Lock-Up Device 4]

Figure 2:
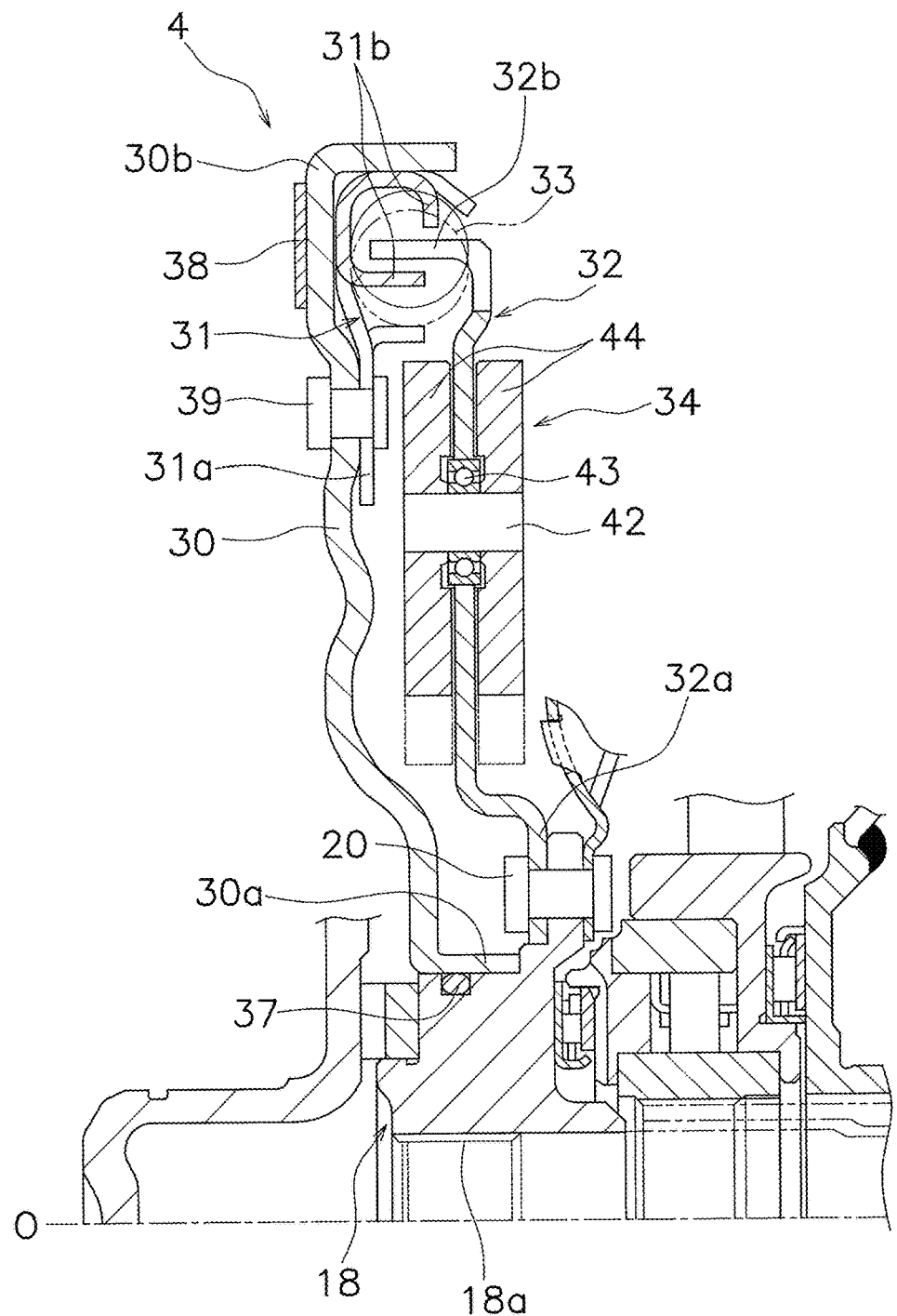
FIG. 2 is a diagram showing the lock-up device extracted from FIG. 1.

The lock-up device 4 is a mechanism disposed between the turbine 6 and the front cover 2 so as to mechanically couple the both components. As shown in FIGS. 1 and 2, the lock-up device 4 includes a piston 30, a drive plate 31, a driven plate 32, a plurality of torsion springs 33, a plurality of pendulum units 34 and a plurality of stoppers 35 (see FIGS. 3 and 4). FIG. 2 is a diagram showing a region including the lock-up device 4 extracted from FIG. 1.

<Piston 30>

The piston 30 is a member for clutch engagement and disengagement, and has a disc shape with a center hole. An inner peripheral tubular part 30a is formed on the inner peripheral edge of the piston 30, and extends axially toward the transmission. The inner peripheral tubular part 30a is supported by the outer peripheral surface of the engine-side part of the turbine hub 18, and is thereby movable in both the rotational direction and the axial direction. It should be noted that the piston 30 is contacted to a surface of the transmission-side part of the turbine hub 18, and is thereby restricted from moving axially toward the transmission.

Additionally, a seal ring 37 is mounted to the outer peripheral surface of the engine-side part of the turbine hub 18, and is contacted to the inner peripheral surface of the inner peripheral tubular part 30a of the piston 30. With the construction, the inner peripheral edge of the piston 30 is sealed. Moreover, an annular friction coupling part 30b is formed on the outer peripheral part of the piston 30. An annular friction facing 38 is fixed to the axially engine-side surface of the friction coupling part 30b.

<Drive Plate 31>

The drive plate 31 is a disc-shaped member. The drive plate 31 includes a fixation part 31a in the inner peripheral part thereof, and includes a plurality of engaging parts 31b in the outer peripheral part thereof. The fixation part 31a is fixed to the piston 30 by rivets 39. Additionally, the plural engaging parts 31b are formed by partially bending the outer peripheral part of the drive plate 31 toward the turbine 6. The engaging parts 31b are respectively contactable to the circumferential end surfaces of the torsion springs 33.

<Driven Plate 32>

The driven plate 32 is a disc-shaped member. The driven plate 32 includes a fixation part 32a in the inner peripheral part thereof, and includes a plurality of engaging parts 32b in the outer peripheral part thereof. The fixation part 32a is fixed together with the turbine shell 16 to the turbine hub 18 by the rivets 20. Additionally, the plural engaging parts 32b are formed by partially protruding the outer peripheral part of the driven plate 32 to the further outer peripheral side and bending the protruded parts toward the front cover 2. The engaging parts 32b are respectively contactable to the circumferential end surfaces of the torsion springs 33.

Figure 3:
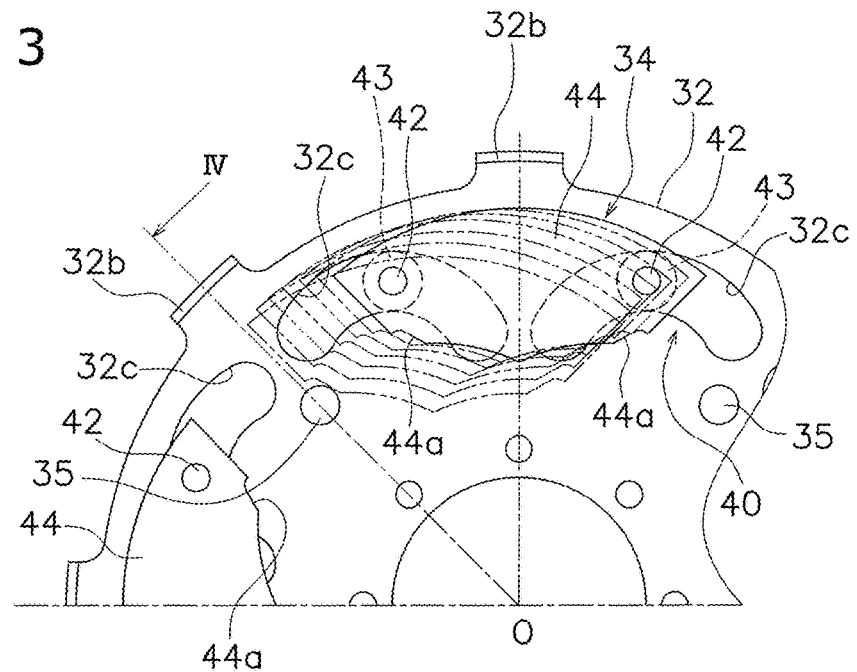
FIG. 3 is a front view of pendulum units.

FIG. 3 shows a partial front view of the driven plate 32. The driven plate 32 includes a plurality of (four in this example) guide groove parts 40. Each guide groove part 40 includes two grooves 32c that are line-symmetrically formed. The two grooves 32c respectively have a circular-arc shape and the adjacent ends thereof are disposed on the inner peripheral side of the remote ends thereof.

<Torsion Springs 33>

As shown in FIGS. 1 and 2, the plural torsion springs 33 are supported by the piston 30, the drive plate 31 and the driven plate 32. Additionally, the torsion springs 33 are restricted from axially and radially moving by the drive plate 31.

<Pendulum Units 34>

Each of the plural pendulum units 34 is supported by its corresponding guide groove part 40. When the driven plate 32 is rotated, each pendulum unit 34 is configured to swing along its corresponding guide groove part 40 so as to attenuate vibration.

Each pendulum unit 34 includes two pins 42, two bearings 43 respectively mounted to the pins 42, and a pair of swing plates 44.

The two pins 42 respectively penetrate the grooves 32c in the axial direction, and the bearings 43 are respectively mounted to the axially intermediate parts of the pins 42. Therefore, the pins 42 are supported by the grooves 32c through the bearings 43 and are slidable along the grooves 32c.

As shown in FIGS. 1 and 2, the swing plates 44 of each pair are disposed while being axially opposed to each other through the driven plate 32. Additionally, as shown in FIG. 3, each swing plate 44 has a sector shape and is arranged to overlap both of adjacent two grooves 32c. Moreover, each swing plate 44 includes contact parts 44a on the circumferential ends of the inner peripheral part thereof. Furthermore, the swing plates 44 of each pair are fixed to each other, while the both ends of each of two pins 42 are swaged to the swing plates 44.

In the construction as described above, the pins 42 and the bearings 43 are moved along the grooves 32c, and thereby, each pair of swing plates 44 is capable of swinging as depicted with dashed two-dotted line in FIG. 3.

<Stoppers 35>

Figure 4:
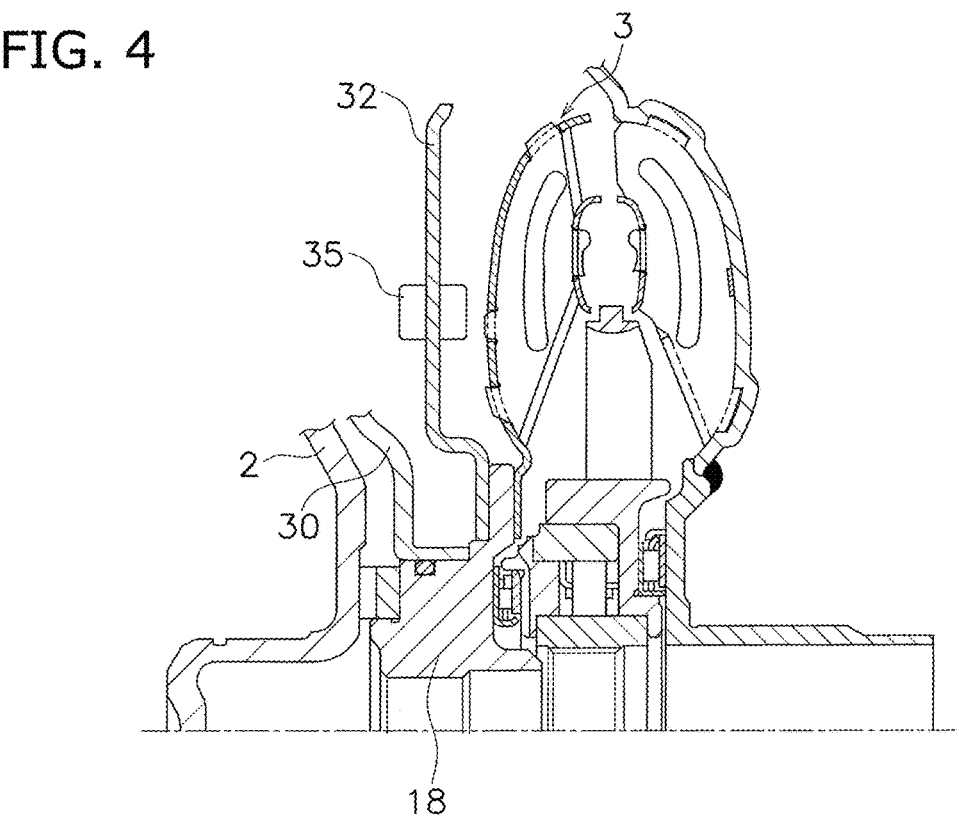
FIG. 4 is a cross-sectional view of FIG. 3 taken along line IV-O.

The plural stoppers 35 are elastic members made of resin, and are fixed to the driven plate 32 as shown in FIGS. 3 and 4. It should be noted that FIG. 4 is a cross-sectional view of FIG. 3 taken along line IV-O.

Specifically, each stopper 35 is fixed between adjacent guide groove parts 40. When described in more detail, each stopper 35 is disposed between one of the remotely located ends of two grooves 32c composing one of adjacent guide groove parts 40 and one of the remotely located ends of two grooves 32c composing the other of the adjacent guide groove parts 40, and is also disposed on the inner peripheral side of the respective ends. With this positional arrangement of each stopper 35, each pendulum unit 34 swinging along two grooves 32c is configured to be contacted to each stopper 35 at one contact parts 44a of the swing plates 44 of each pair before the bearings 43 are respectively contacted to one circumferential end surfaces of the grooves 32c. In other words, the swing range of each pendulum unit 34 is configured to be restricted by the stoppers 35.

[Actions]

When engine rotational speed is in a low rotational speed range, the piston 30 is moved to the transmission side and stays there by difference in pressure of the operating oil between the both sides of the piston 30 in the axial direction. In other words, the friction facing 38 is separated from the front cover 2, and thus, a lock-up state is released. When the lock-up state is thus released, a torque from the front cover 2 is transmitted from the impeller 5 to the turbine 6 through the operating oil.

When the speed ratio of the torque converter 1 increases and the engine rotational speed reaches a predetermined rotational speed, the operating oil on the engine side of the piston 30 is discharged. As a result, the piston 30 is moved toward the front cover 2, and the friction facing 38 is pressed onto the friction surface of the front cover 2. As a result, the torque of the front cover 2 is transmitted to the torsion springs 33 through the piston 30 and the drive plate 31, and is further transmitted to the turbine hub 18 through the driven plate 32. In other words, the front cover 2 is mechanically coupled to the turbine hub 18, and the torque of the front cover 2 is directly outputted to the input shaft of the transmission through the turbine 6.

When variation in engine torque herein occurs, vibration is absorbed by extension and contraction of the torsion springs 33 and hysteresis torque generated in respective components. Additionally, when variation in torque occurs, the pendulum units 34 are configured to be moved along the grooves 32c of the driven plate 32. However, during actuation of the lock-up device 4, a centrifugal force acts on each pendulum unit 34, and hence, a force of restoring each pendulum unit 34 to the circumferential center position as shown in FIG. 3 acts on each pendulum unit 34. Vibration can be further inhibited by the actions of forces on the pendulum units 34.

When variation in torque is large during the action of each pendulum unit 34 as described above, each pendulum unit 34 comes to swing in a wide range. In this case, one contact parts 44a of the swing plates 44 of each pair are contacted to each stopper 35, and the swing range of the swing plates 44, i.e., the swing range of each pendulum unit 34 is restricted.

Due to the above, each bearing 43, through which each pin 42 is supported by each groove 32c, can be avoided from colliding against the end surfaces of each groove 32c. Accordingly, abnormal abrasion of each groove 32c, damage of the driven plate 32 or damage of each bearing 43 can be prevented. Additionally, each stopper 35 is made of an elastic member. Hence, it is possible to inhibit production of noise in collision, and in addition, to prevent abrasion and damage of the swing plates 44 by relieving shock in collision.

[Features]

(1) The swing range of each pendulum unit 34 is restricted by the stoppers 35. Hence, the bearings 43 of each pendulum unit 34 can be avoided from colliding against the ends of the grooves 32c of the driven plate 32. Therefore, abnormal abrasion and damage of the driven plate 32 and damage of the bearings 43 can be prevented.

(2) Each stopper 35 is made of an elastic member. Hence, shock in collision of each pendulum unit 34 against each stopper 35 can be relieved, and noise and damage of respective components can be avoided.

(3) A vibration attenuating mechanism can be implemented only by forming the grooves 32c in the driven plate 32 of a well-known lock-up device and attaching the swing plates 44 and so forth to the driven plate 32. Therefore, the well-known device can be easily improved at low cost.

(4) Each pendulum unit 34 can be made of a simple member, and the vibration attenuating mechanism can be implemented at low cost without occupying an excessive space.

Other Exemplary Embodiments

The present invention is not limited to the aforementioned exemplary embodiment, and a variety of changes and modifications can be made without departing from the scope of the present invention.

Figure 5:
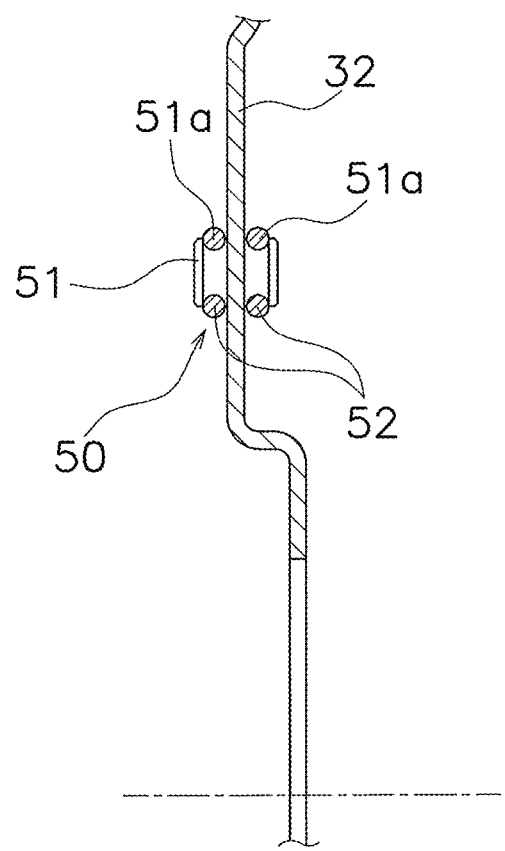
FIG. 5 is a side view of a stopper according to another exemplary embodiment of the present invention.

(a) In the aforementioned exemplary embodiment, each stopper is constructed as an elastic member made of resin. However, the construction of each stopper is not limited to the above. For example, as shown in FIG. 5, each of stoppers 50 includes a body 51 and elastic members 52. The body 51 is a pin axially penetrating the driven plate 32, and includes two annular grooves 51a formed such that the driven plate 32 is interposed therebetween. Each elastic member 52 is constructed as, for instance, an O-ring, and is mounted to each annular groove 51a of the body 51. The construction herein described can similarly achieve advantageous effects similar to those achieved by the aforementioned exemplary embodiment.

(b) In the aforementioned exemplary embodiment, the stoppers configured to be contacted to both of the swing plates of each pair are provided. However, stoppers configured to be contacted to only one of the swing plates of each pair may be provided instead.

(c) The construction of each pendulum unit is not limited to that of the aforementioned exemplary embodiment. The bearings respectively mounted to the outer peripheral parts of the pins may not be provided, and the swing plates of each pair may be coupled by a single pin. Moreover, the swing plates may be mounted to only one side of the driven plate 32.

INDUSTRIAL APPLICABILITY

According to the pendulum damper device of the present invention, it is possible to inhibit abnormal abrasion and damage of a member to which pendulums are attached and its related members. On the other hand, according to the lock-up device of the present invention, it is possible to add a mechanism for attenuating vibration to a well-known lock-up device at low cost without occupying an excessive space, and in addition, to inhibit the abnormal abrasion and damage.

REFERENCE SIGNS LIST

1 Torque converter
4 Lock-up device
31 Drive plate (Input rotary member)
32 Driven plate (Output rotary member)
32c Groove
33 Torsion spring
34 Pendulum unit
35 Stopper
40 Guide groove part
42 Pin
43 Bearing
44 Swing plate

The invention claimed is:

1. A pendulum damper device, comprising:
a rotary member rotatable about a rotational axis, the rotary member including a plurality of guide groove parts circumferentially aligned, at least one of the plural guide groove parts including a groove;
a plurality of pendulum units having support parts and supported by the guide groove parts, the pendulum units to swing along the guide groove parts so as to attenuate vibration when the rotary member is rotated, at least one of the support parts being a pin axially penetrating the groove and capable of swinging along the groove; and
a plurality of stoppers mounted to the rotary member, each of the stoppers to be contacted to a part of each of the pendulum units before the support parts of the pendulum units are respectively contacted to a circumferential end surface of the guide groove parts so as to restrict a swing range of the respective of the pendulum units.

2. The pendulum damper device recited in claim 1, wherein each of the stoppers includes an elastic part at least in a region thereof to which each of the pendulum units is to be contacted.

3. The pendulum damper device recited in claim 1, wherein
each of the plural guide groove parts includes a first groove and a second groove, the groove being one of the first and second grooves, the first and second grooves respectively having a circular-arc shape, the first and second grooves arranged line-symmetrically to each other,
each of the pendulum units includes
first and second pins, the pin being one of the first and second pins, the first pin axially penetrating the first groove and capable of swinging along the first groove, the second pin axially penetrating the second groove and capable of swinging along the second groove, and a pair of swing plates, the swing plates disposed axially in opposition to each other through the rotary member, the swing plates respectively arranged to overlap with both of the first and second grooves, the swing plates fixed to each other by the first and second pins, at least one of the swing plates contactable to each of the stoppers.

4. The pendulum damper device recited in claim 3, wherein the first and second pins are respectively supported by and capable of swinging along the first and second grooves through bearings.

5. The pendulum damper device recited in claim 3, wherein adjacent ends of the first and second grooves are disposed on an inner peripheral side of remote ends thereof.

6. A lock-up device for a torque converter, the lock-up device to transmit a torque from a front cover to a turbine of the torque converter, the lock-up device comprising:

an input rotary member;

a clutch portion disposed between the front cover and the input rotary member;

an output rotary member coupled to the turbine, the output rotary member including a plurality of guide groove parts circumferentially aligned, at least one of the plural guide groove parts including a groove;

a plurality of elastic members elastically and rotation-directionally coupling the input rotary member and the output rotary member;

a plurality of pendulum units having support parts and supported by the guide groove parts of the output rotary member, at least one of the support parts being a pin axially penetrating the groove and capable of swinging along the groove, the pendulum units to swing along the guide groove parts so as to attenuate vibration when the output rotary member is rotated; and a plurality of stoppers mounted to the output rotary member, the stoppers to be contacted to a part of each of the pendulum units before the support parts of the pendulum units are respectively contacted to a circumferential end surface of the guide groove parts so as to restrict a swing range of the respective of the pendulum units.

* * * * *